United States Patent [19]

Gibbs et al.

[11] Patent Number: 5,447,179

[45] Date of Patent: Sep. 5, 1995

[54] NON-CORROSIVE DOUBLE-WALLED STEEL TUBE CHARACTERIZED IN THAT THE STEEL HAS A FACE-CENTERED CUBIC GRAIN STRUCTURE

[75] Inventors: Glen Gibbs, Warren; Arnold T. Johnson, Davisburg, both of Mich.

[73] Assignee: ITT Corporation, New York, N.Y.

[21] Appl. No.: 83,635

[22] Filed: Jun. 28, 1993

Related U.S. Application Data

[60] Continuation-in-part of Ser. No. 646,512, Jan. 25, 1991, Pat. No. 5,222,652, which is a division of Ser. No. 525,787, May 18, 1990, Pat. No. 5,069,381.

[51] Int. Cl.$^6$ .............................................. F16L 9/14
[52] U.S. Cl. ................................... 138/143; 138/140; 138/141; 138/172; 228/127
[58] Field of Search ............... 138/140, 141, 142, 143, 138/144, 172, 174, 177, 178; 228/127; 428/586

[56] References Cited

U.S. PATENT DOCUMENTS

| | | |
|---|---|---|
| 1,431,368 | 12/1922 | Bundy . |
| 1,531,730 | 3/1925 | Bundy . |
| 1,537,404 | 5/1925 | Bundy . |
| 1,650,321 | 11/1927 | Bundy . |
| 1,685,269 | 9/1928 | Bundy . |

(List continued on next page.)

FOREIGN PATENT DOCUMENTS

| | | |
|---|---|---|
| 0046134 | 1/1987 | European Pat. Off. . |
| 0375039 | 6/1990 | European Pat. Off. . |
| 2327318 | 5/1977 | France . |
| 2839684 | 11/1979 | Germany . |
| 2828960 | 1/1980 | Germany . |
| 1020061 | 2/1976 | Japan . |
| 53-0033304 | 9/1978 | Japan . |
| 118361 | 9/1979 | Japan . |
| 359731 | 10/1931 | United Kingdom . |
| 354154 | 12/1932 | United Kingdom . |
| 510688 | 10/1937 | United Kingdom . |
| 1165159 | 9/1969 | United Kingdom . |
| 2039808 | 8/1980 | United Kingdom . |
| 2045137 | 10/1980 | United Kingdom . |
| 2057313 | 4/1981 | United Kingdom . |
| 2241185 | 8/1991 | United Kingdom . |
| 992599 | 1/1983 | U.S.S.R. . |

OTHER PUBLICATIONS

Metals Handbook 9th Ed vol. 6, pp. 1006–1013.

Nicht rostende staehle, 2nd edition of the Deutsche (List continued on next page.)

*Primary Examiner*—James E. Bryant, III
*Attorney, Agent, or Firm*—Robert P. Seitter; J. Gordon Lewis

[57] ABSTRACT

A seamless double-walled metal tube which has an outer wall composed of steel having a face-centered cubic grain structure, an inner wall concentrically disposed within the outer wall, the inner wall composed of a steel having a face-centered cubic grain structure, the inner wall having an outerwardly oriented surface directed toward an inwardly oriented surface of the outer wall. The seamless double-wall metal tube also has an intermediate bonding metal region interposed between and metallurgically bonded to the inner wall and the outer wall. The intermediate bonding region is composed of a metal capable of metallurgically bonding with the inner wall and the outer wall. The seamless double-walled metal tube can be produced by instantaneously elevating the temperature of the surface of the steel employed in an unsealed double-walled metal tube to a brazing temperature while maintaining the tube material in a humidified gaseous atmosphere; maintaining the surface temperature of the steel tube for an interval sufficient to permit fusion between the metal capable of metallurgically bonding with the steel in the inner and the outer wall; after metal fusion has been achieved, allowing the resulting fused metal material to cool to a first lowered temperature at a rate which retards the formation of fine-grained steel crystals in the metal; and after reaching a metallurgical transformation point, rapidly cooling the fused tube to a temperature below which the metal capable of metallurgical bonding is not reactive with oxygen.

12 Claims, 13 Drawing Sheets

U.S. PATENT DOCUMENTS

| | | | |
|---|---|---|---|
| 1,688,178 | 10/1928 | Drevitson . | |
| 1,763,755 | 6/1930 | Bundy . | |
| 1,827,381 | 10/1931 | Bundy . | |
| 1,863,874 | 6/1932 | Quarnstrom . | |
| 1,875,885 | 9/1932 | Quarnstrom . | |
| 1,892,607 | 12/1932 | Bundy . | |
| 1,895,133 | 1/1933 | Quarnstrom . | |
| 1,896,371 | 2/1933 | Quarnstrom . | |
| 1,909,501 | 6/1933 | Quarnstrom . | |
| 2,014,982 | 9/1935 | Quarnstrom . | |
| 2,014,983 | 9/1935 | Quarnstrom . | |
| 2,018,089 | 10/1935 | Quarnstrom . | |
| 2,092,018 | 9/1937 | Quarnstrom . | |
| 2,197,191 | 4/1940 | Nichols et al. . | |
| 2,373,116 | 4/1945 | Hobrock . | |
| 2,380,107 | 7/1945 | Hobrock . | |
| 2,720,022 | 10/1955 | Snively . | |
| 2,772,121 | 11/1956 | Meissner . | |
| 2,996,799 | 8/1961 | Gaul . | |
| 3,007,810 | 11/1961 | Hobrock . | |
| 3,076,260 | 2/1963 | Roehl . | |
| 3,077,661 | 2/1963 | Fromson . | |
| 3,220,107 | 11/1965 | Clark . | |
| 3,350,771 | 11/1967 | Durst . | |
| 3,355,795 | 12/1967 | Clark . | |
| 3,382,052 | 2/1964 | Clarke . | |
| 3,389,455 | 6/1968 | Clarke . | |
| 3,400,449 | 9/1968 | Maguire et al. . | |
| 3,417,453 | 12/1968 | Clarke . | |
| 3,434,200 | 3/1969 | Russell . | |
| 3,457,626 | 7/1969 | Coad . | |
| 3,566,741 | 3/1971 | Sliney | 138/143 |
| 3,610,290 | 10/1971 | Anderson et al. . | |
| 3,798,011 | 3/1974 | Sharp | 138/143 |
| 4,016,008 | 4/1977 | Jones et al. | 138/143 |
| 4,505,232 | 3/1985 | Usami et al. | 138/143 |
| 4,593,446 | 6/1986 | Hayner . | |
| 4,943,489 | 7/1990 | Kuhara et al. | 138/143 |
| 5,042,710 | 8/1991 | Siemers et al. . | |
| 5,145,103 | 9/1992 | Johnson . | |
| 5,222,652 | 6/1993 | Gibbs et al. | 138/142 |
| 5,265,793 | 11/1993 | Usui et al. | 228/127 |
| 5,297,410 | 3/1994 | Goff | 138/143 |
| 5,297,587 | 3/1994 | Johnson | 138/140 |

OTHER PUBLICATIONS verein für Eisen huetten leute, publ. in 1989 (p. 21, FIG. 207).

Din-Pocket book 155, Published by Boyd Verlag in 1981; Stahlundeisen Goethen Orment p. 236.

German Patent Office-Published for Opposition Jun. 13, 1991, DE 40-10 178C1.

The Making Shaping and Treating of Steel, 8th Ed McGannon, Harold E. Ed, US Steel Corp. pp. 1111–1130.

Metals Handbook Ninth Ed., vol. 3, pp. 16, 17 "Pipe, tubes and Tubing", copyright 1980.

NON-CORROSIVE DOUBLE-WALLED STEEL TUBE CHARACTERIZED IN THAT THE STEEL HAS A FACE-CENTERED CUBIC GRAIN STRUCTURE

CROSS REFERENCE TO RELATED APPLICATIONS

This application is a continuation-in-part of U.S. Ser. No. 07/646,512 filed on Jan. 25, 1991 which issued as U.S. Pat. No. 5,222,652 on Jun. 29, 1993, which itself, is a divisional application of Ser. No. 07/525,787, filed May 18, 1990 which issued as U.S. Pat. No. 5,069,381 on Feb. 3, 1991.

BACKGROUND OF THE INVENTION

1. Field of the Invention

This invention relates to corrosion-resistant double-walled tubes and processes for manufacturing such tubes. Double-walled tubes such as those produced by the process of the present invention are suitable for a variety of uses such as in automotive brake lines. This invention also relates to a process for brazing a selected metal to a non-ferritic steel surface.

2. Discussion of the Relevant Art

Safety standards in the automotive industry dictate that critical elements such as automotive brake lines be resistant to leakage, puncture and corrosion. In order to achieve these objectives, double-walled tubes for brake lines have been adopted as the industry standard. Such a double-walled tube consists of at least two thicknesses of a breakage-resistant metal material having sufficient properties to withstand fatigue due to prolonged vibration. The double-walled tube employed in automotive vehicles is generally referred to as "seamless", meaning that there is no seam extending the radial length of the tube wall, from the inner diameter of the tube to the outer diameter. Thus, the possibility of leakage at any joined seam is essentially eliminated. The material of choice, up to this point, has been carbon steel due to its inherent flexibility, strength and mechanical durability. A suitable brazing material such as copper or various copper alloys is plated over the surface of the carbon steel prior to formation to permit the ultimate formation of a seamless joint.

A drawback of carbon steel is its susceptibility to corrosion. In an attempt to eliminate this problem, carbon steel brake line tubes have been plated with a variety of corrosion-resistant materials, the most common of which is zinc. Zinc is plated onto the carbon steel surface of the brake line tube in a post-manufacturing process. In order to achieve sufficient corrosion resistance, plating thicknesses as great as 25 microns have been employed. Unfortunately, the zinc-plated surface is susceptible to cracks and chips due to road hazards and continued prolonged vibration. This leads to corrosion and, ultimately, to leaking of the brake line tube.

In order to alleviate this problem, zinc-plated carbon steel tubes have been further coated with high-strength polymers such as polyvinyl fluoride. Polyvinyl fluoride coatings can also crack and chip, and ultimately lead to corrosion problems. Additionally, brake lines coated with polyvinyl fluoride are difficult to dispose of or recycle once the vehicle has reached the end of its useful life.

Ideally, brake lines would be manufactured from a suitable, inexpensive non-corrosive material. However, corrosion-resistant metals such as nickel-chromium (stainless) steel are not amenable to double-walled tube manufacturing processes. Great difficulties have been encountered in imparting a copper overlay to a stainless steel surface, and it has been widely held that copper-plated stainless steel could not be successfully metallurgically brazed. Various face-centered cubic stainless steel materials are considered susceptible to liquid metal embrittlement due to diffusion of liquid copper into the grain boundaries. This can cause hot cracking which causes the cracks to be susceptible to propagation during subsequent cold forming steps. Steels of this type can exhibit embrittlement in weldments and their heat affected zones due to the face-center cubic grain structure when exposed to brazing temperatures in a conventional copper braze environment.

Additionally, the forming processes for manufacturing a continuous seamless double-walled tube require the use of lubricating compounds or materials, such as milling oils, which adhere to the surfaces of the metal and interfere with achieving a uniform 360° metallurgical braze. Removal of these contaminants prior to brazing is imperative but difficult.

Thus, it would be desirable to provide a process for manufacturing seamless double-walled tubing in which contaminating lubricants can be removed or rendered harmless prior to metallurgical brazing. It is also desirable to provide a process in which a highly corrosion-resistant base metal such as non-ferritic or stainless steel can be successfully and economically employed. It is desirable to provide a process in which a selected metal alloy can be successfully metallurgically bonded to a non-ferritic steel surface. It is further desirable to provide a corrosion-resistant double-walled seamless tubing suitable for use in the manufacture of automotive brake lines; meeting the parameters of strength and durability commonly associated with such applications.

The present invention is a double-walled metal tube having an outer wall and an inner wall concentrically disposed therewithin. The inner and outer walls are both composed of steel having a face-centered cubic grain structure. The outwardly oriented surface of the inner wall is directed toward the inwardly oriented surface of the outer wall. The double-walled metal tube also has an intermediate bonding metal region interposed between the metallurgically bonded to the inner wall and the outer wall with the intermediate bonding metal region consisting essentially of a metal capable of metallurgically bonding with the inner wall and the outer wall.

SUMMARY OF THE INVENTION

The present invention also encompasses a process for brazing a selected metal alloy to a non-ferritic steel surface in which the selected metal alloy is plateable on the steel surface. In this process, the temperature of the non-ferritic steel is raised from a first temperature to a second elevated temperature and maintained at that second elevated temperature for an interval sufficient to achieve fusion between the selected metal alloy and the non-ferritic steel surface. The first temperature is less than or essentially equivalent to the volatilization temperature of lubricating materials adhering to the steel surface, if any. The second elevated temperature is sufficient to trigger fusion between the selected metal alloy and the non-ferritic steel surface. The second temperature elevation occurs in a humidified gaseous atmosphere which consists essentially of a non-reactive carrier gas and a reactive gas suitable for and in sufficient concentrations to achieve and promote fluxing.

The non-ferritic steel is maintained in contact with the humidified gaseous atmosphere at or above the second temperature for an interval sufficient to permit fusion between the selected metal alloy and the non-ferritic steel surface. After metal fusion has been achieved, the resulting fused metal material is allowed to cool to a first lowered temperature in a controlled non-oxidative atmosphere at a rate which maximizes the temperature at which metallurgical transformation of the non-ferritic steel from an austenitic to a pearlite phase occurs.

After the metallurgical transformation point has been achieved, the resulting material can be rapidly cooled in a controlled atmosphere to a temperature below which the selected metal alloy is no longer reactive with oxygen. If desired, the resulting metal material can be further quenched in a suitable aqueous medium.

Before the brazing process is begun, the process of the present invention can include the additional optional step of removing any volatile contaminants remaining on the metal surface imparted there during any metal deformation steps. In the process of the present invention, this preferably comprises the step of elevating the surface temperature of the non-ferritic steel from a preliminary temperature to the volatilization temperature. The preliminary temperature may be ambient or any intermediate temperature substantially below the volatilization temperature. The temperature elevation step proceeds in the presence of a non-oxidative atmosphere at a rate sufficient to initiate an essentially instantaneous volatilization of volatilizable solvents and carriers present in the lubricating material.

The process of the present invention can be successfully employed in a process for producing a non-corrosive seamless double-walled tube. Also included in the present invention is a non-corrosive, seamless double-walled tubing suitable for use in automotive brake lines. Suitability of seamless double-wall tubing for use in automotive brake lines is commonly defined in the industry by ASTM A254, the disclosure of which is incorporated herein by reference, which specifies the tube must withstand a minimum hydrostatic pressure of 3,459 psi, have a minimum tensile strength of 42,000 psi; minimum yield strength of 25,000 psi; and elongation in 2 inches of at least 25%. Additionally, the tube must exhibit no cracking or other flaws when subjected to a flare test resulting in a 1:20 taper expansion as enumerated in paragraph 6.3 of test method A254.

BRIEF DESCRIPTION OF THE DRAWING

In the present description, reference is made to the following drawing in which:

FIG. 5b is a dot mapping for nickel of the section of FIG. 5a;

FIG. 5c is a dot mapping for copper of the section of FIG. 5a;

FIG. 6b is a dot mapping diagram of the incidence of nickel occurring in the section of FIG. 6a;

FIG. 6c is a dot mapping diagram of the incidence of copper occurring in the section of FIG. 6a;

FIG. 9b is a dot mapping for nickel for the section of FIG. 9a;

FIG. 9c is a dot mapping for copper for the section of FIG. 9a;

FIG. 10b is a dot mapping for nickel for the section of FIG. 10a;

FIG. 10c is a dot mapping for copper for the section of FIG. 10a;

DESCRIPTION OF THE PREFERRED EMBODIMENT

Figure 1:
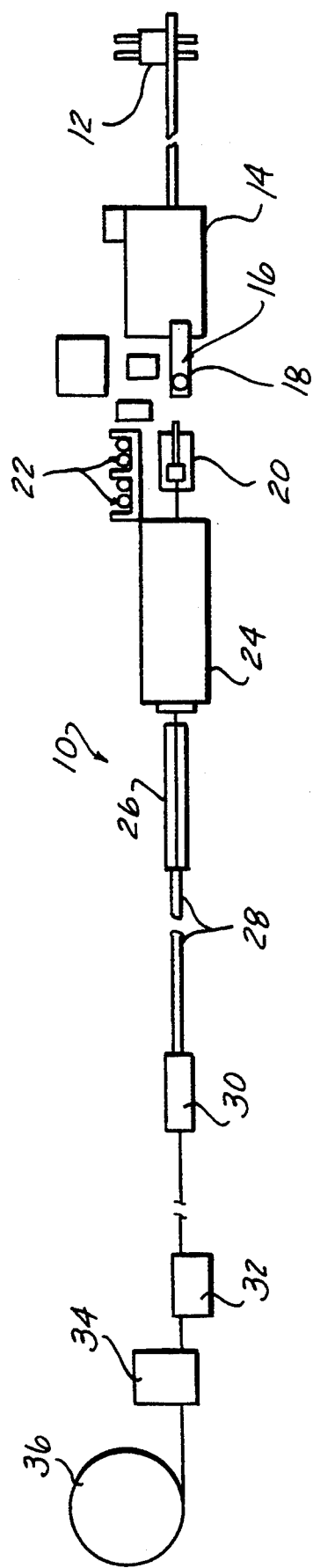
FIG. 1 is a schematic view of the process of the present invention.
Figure 2A:
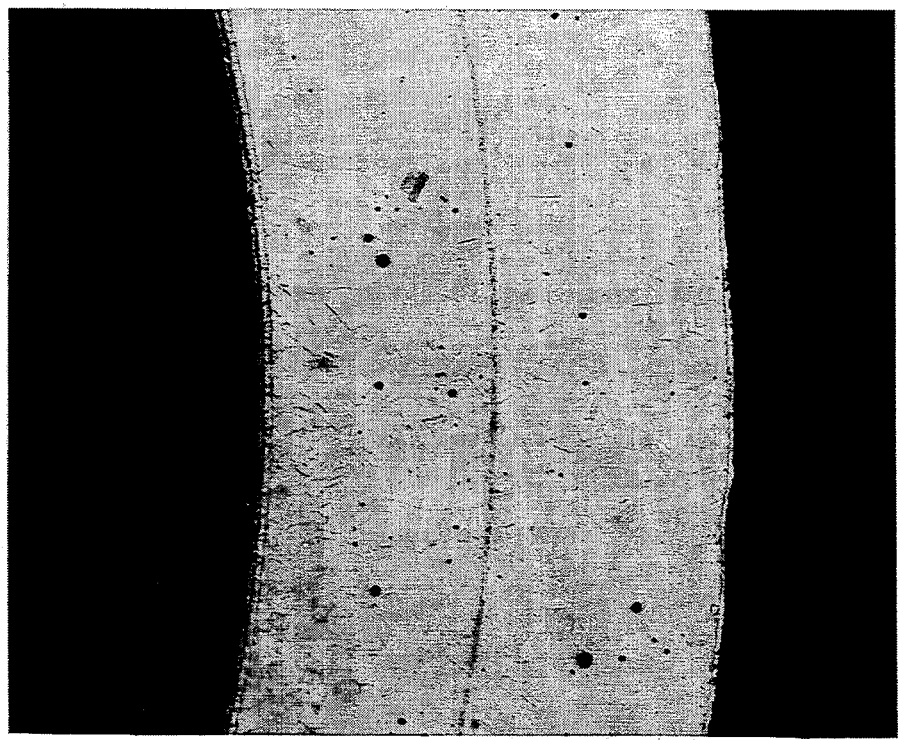
FIG. 2a is a photomicrograph of a transverse section of tubing prepared according to the process of the present invention at a magnification of 100×.
Figure 2B:
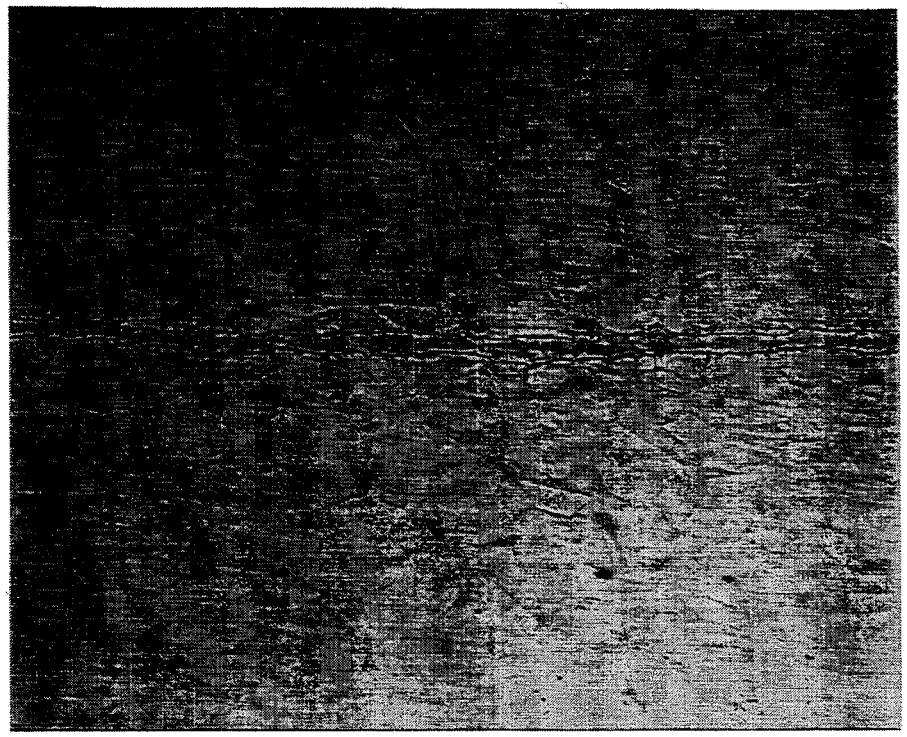
FIG. 2b is a photomicrograph of the transverse section of FIG. 2a at a magnification of 500×.
Figure 3A:
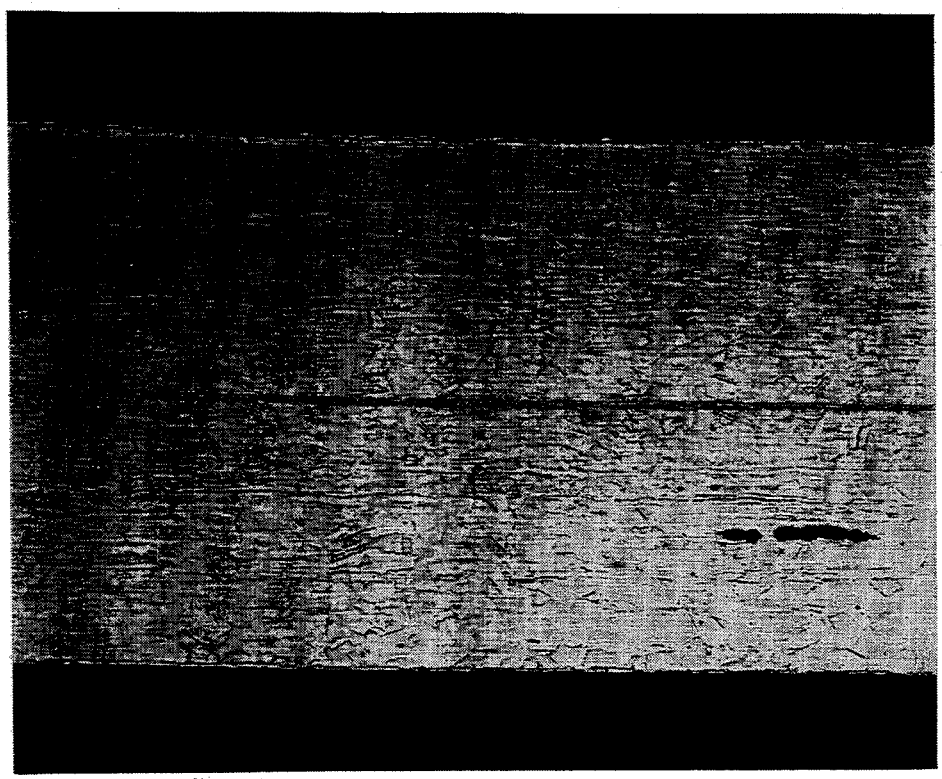
FIG. 3a is a photomicrograph of the longitudinal section of tubing prepared according to the process of the present invention at a magnification of 100×.
Figure 3B:
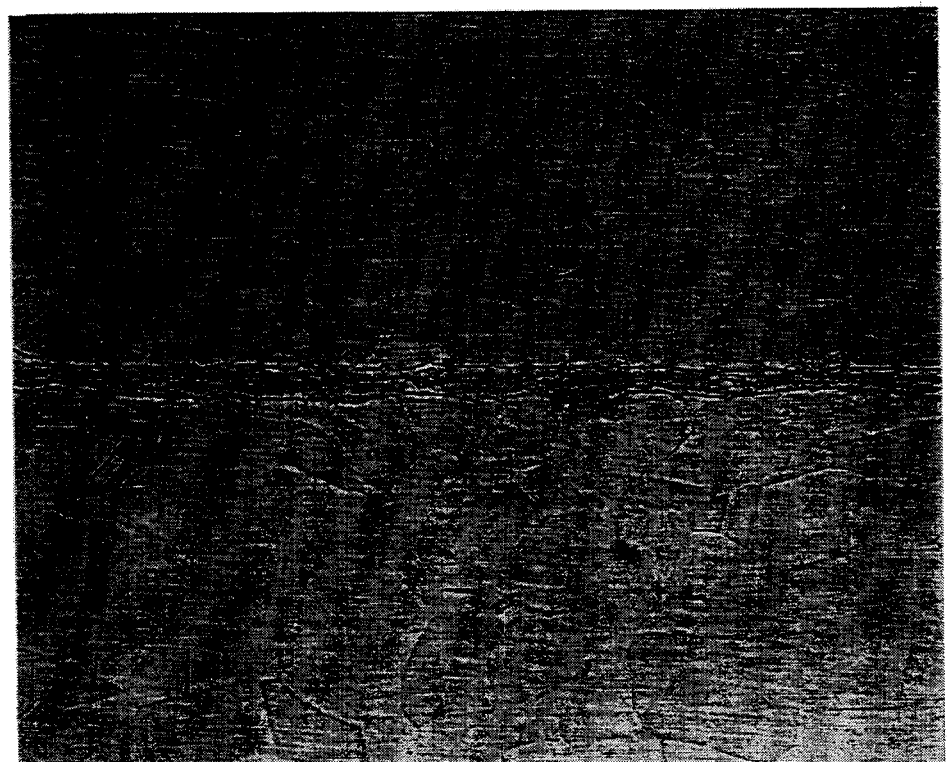
FIG. 3b is a photomicrograph of the longitudinal section of FIG. 3a at a magnification of 500×.

The present invention is predicated on the unexpected discovery that a selected metal alloy such as copper or silver previously plated on a non-ferritic steel surface can be successfully fused to that surface in a brazing process. This brazing process permits the fusion of double walls to one another, thereby producing a continuous, seamless non-corrosive metal tube.

The present invention also includes a process for brazing a selected metal alloy to a non-ferritic steel surface. The brazing process of the present invention comprises the following steps:

rapidly raising the temperature of the non-ferritic steel from a first temperature to a second elevated temperature sufficient to trigger fusion between the selected metal alloy and the non-ferritic steel surface, the temperature elevation occurring in a humidified gaseous atmosphere consisting essentially of a non-reactive carrier gas and a reactive gas suitable for and in sufficient concentration to achieve fluxing;

maintaining the non-ferritic steel in contact with the humidified gaseous atmosphere at the second temperature for an interval sufficient to permit fusion between the selected metal alloy and the non-ferritic steel surface;

once metal fusion has been achieved, allowing the resulting fused metal material to cool to a first lowered temperature in a controlled non-oxidative atmosphere at a rate which maximizes the temperature at which metallurgical transformation of the non-ferritic steel from an austenitic to a pearlite phase occurs; and after reaching the metallurgical transformation point, continuing cooling of the fused metal material in a controlled atmosphere to a temperature below which the selected metal alloy is not reactive with oxygen.

The humidified gaseous atmosphere employed in the first step is preferably a mixture of nitrogen with sufficient hydrogen to achieve and maintain fluxing. A suitable volumetric concentration of hydrogen would be readily discernable by one reasonably skilled in the art. In the preferred embodiment, it has been found that concentrations of hydrogen between about 50% and about 75% by volume can be successfully employed. The process of the present invention is to be construed as encompassing functional equivalents of the described gases.

The term "non-ferritic steel" as used herein is generally defined as non magnetic, nickel chrome stainless.

In the preferred embodiment, the non-ferritic steel is a stainless steel consisting essentially of iron, chromium, nickel, manganese, silicon, and carbon. The amount of carbon is, preferably, limited to amounts no more than 0.03% by weight. An illustrative example of one such non-ferritic steel is set forth in Table 1.

Materials such as that defined in Table 1 are commonly referred to as AISI Type 201L. Such materials are commonly defined as face-centered cubic materials due to the crystalline surface structure exhibited upon manufacture.

TABLE 1

| TYPICAL ANALYSIS OF A NON-FERRITIC STEEL | |
|---|---|
| Element | Percent |
| Carbon | 0.03 |
| Manganese | 7.00 |
| Silicon | 0.50 |
| Chromium | 16.75 |
| Nickel | 5.00 |
| Nitrogen | 0.07 |

The selected metal alloy is one capable of being uniformly deposited on the surface of the non-ferritic steel. The deposition process may be any suitable mechanical, chemical, or electrochemical process which will permit permanent or, at the minimum, semi-permanent mechanical adhesion of a selected metal alloy to the non-ferritic steel surface. The preferred selected metal alloys are alloys of metals such as copper, silver or any other suitable alloy. Additionally, non-alloyed metals such as copper, silver or any other suitable metal can also be successfully used in the process of the present invention.

The deposition process is, preferably, an electroplating process which can be employed successfully on non-ferritic or stainless steel which has been prepared by a Woods-nickel strike. The Woods-nickel strike imparts a Woods-nickel composition to the surface of the stainless steel. The Woods-nickel composition will mask the existing nickel-chromium oxides to permit copper plating. The plated surface is, then, rendered suitable for subsequent brazing procedures.

Where the objective is the formation of double-walled tubing, the electroplateable brazing alloy is deposited on the non-ferritic steel surface prior to formation of the double-walled tubing. The double-walled tubing can be rolled and formed by any conventional method. In order to achieve 360° brazing around the entire tube surface, the subsequent brazing steps of the present invention are employed.

In the preferred embodiment, in order to permit more effective brazing action, lubricating materials applied to the plated non-ferritic steel prior to formation of the continuous tube may be removed. The lubricating materials commonly employed in metal formation processes such as those in which a continuous metal tube is formed generally contain carbon or graphite materials suspended in a variety of volatilizable solvents and carrier materials. During conventional brazing operations, these materials are sintered into a carbonaceous material which inhibits brazing action. Without being bound to any theory, it is believed that the brazing inhibition is due to the interposition of the carbonaceous material between layers of non-ferritic steel to be brazed. The carbonaceous material acts as an insulating material inhibiting suitable heat transfer.

In the process of the present invention, the formed metal material exits formation machinery at an essentially ambient preliminary temperature with lubricating materials adhering thereto. The surface temperature of the non-ferritic steel is rapidly elevated from this preliminary temperature which is substantially below the volatilization temperature of the solvents and carriers present in the lubricating material to a temperature equal to or above the temperature at which volatilizable solvents and carriers present in the lubricating material will experience essentially instantaneous volatilization. It will be appreciated that this temperature elevation is essentially instantaneous. This unique, essentially instantaneous, temperature rise is described herein as a "shock heating" of the metal surface. It has been found that a shock heat elevation to a temperature equal to or above 900° F. will achieve the essentially instantaneous volatilization desired. In order to prevent undesired oxidation of the selected metal alloy plating, the shock heating step occurs in a non-oxidative gaseous atmosphere. The gaseous material is preferably an anhydrous non-reactive gas such as one selected from the group consisting of nitrogen, hydrogen, carbon monoxide, and mixtures thereof. The non-oxidative gaseous atmosphere permits and promotes the volatilization of the volatilizable solvents and carriers present in the lubricating compound. In the preferred embodiment, the non-oxidative gaseous atmosphere is nitrogen. However, functional equivalents of nitrogen are contemplated and considered within the scope of this invention.

Because the volatilization is essentially instantaneous, the solvents and carriers volatilize in a manner which physically drives them from the surface of the prepared metal. Where two sheets of metal overlay one another, such as in double-walled tubing, this process of rapid shock heating eliminates volatilizable solvents and carriers interposed between the two respective layers of non-ferritic steel. Heretofore, it has been almost impossible to completely eliminate such contaminants without employing complex mechanical scrubbing or removal operations. It is to be understood that in certain situations such as the formation of double-walled tubing, even such mechanical scrubbing is impossible. However, the shock heating process of the present invention permits removal of volatilizable solvents and carriers, thereby insuring a uniform 360° brazing operation.

Without being bound to any theory, it is believed that the shock heating procedure triggers an almost explosive volatilization of solvents and carriers in the lubricating material. When such shock heating is employed with double-walled tubing, the explosive force of the volatilization initiates a micro-expansion between the two respective overlaying walls. The gap between the walls created by the micro-expansion process permits the escape of volatilizable solvents and carriers. Carbon dust remains as a residue after this step is completed. The residual carbon dust does not interfere with subsequent brazing procedures. The dust can remain on the interior and various surfaces of the tubing until the brazing operation is completed. Any residual dust can be blown from the exposed surfaces upon completion of the tube formation process. In the preferred embodiment, the volatilization temperature is above the volatilization point of the solvents and carriers but below any metallurgical phase transformation point for the non-ferritic steel. This range is between about 800° F. and about 900° F.

Once volatilizable solvents and carriers have been removed from the metal surface, brazing procedures can proceed. In order to promote brazing, it is necessary to substitute the non-oxidative gaseous atmosphere used in the elevation step with an atmosphere which will support fluxing. In the preferred embodiment, the atmosphere for supporting fluxing is a mixture of nitrogen and hydrogen which has been humidified and has a dew point greater than about −42° F. In the preferred embodiment, the substitution of atmospheres may occur in any convenient manner after the solvents and carriers have been volatilized, the non-ferritic steel can be exposed to ambient temperature for a brief interval during the exchange of gaseous atmospheres. Once this has been completed, the temperature of the non-ferritic steel is raised rapidly from the volatilization temperature to a second elevated temperature sufficient to trigger fusion between the selected metal or metal alloy and the non-ferritic steel surface. The term "fusion" as used herein is defined as the existence or establishment of a metallurgical bond between two dissimilar metals. This rate of temperature elevation is as rapid as possible to approximate or achieve essentially instantaneous temperature rise. This phenomenon is a second shock heating of the metal material.

The second elevated temperature to which the surface of the non-ferritic steel is elevated is a sufficient amount higher than the liquidus temperature of the selected metal plated on the non-ferritic steel to trigger and maintain the fusion process. "Liquidus temperature" is defined herein as the temperature at which a metal or metal alloy begins to enter its molten state. In the preferred embodiment, where copper is employed, the liquidus temperature of the copper is 1,980° F. The second elevated temperature is, preferably, at or above between 2,000° F. to 2,050° F. The upper maximum for the second elevated temperature is determined by both the properties of the non-ferritic steel and selected metal material employed. Ideally, the upper temperature is limited to a point below thermal degradation or melting of the steel substrate and/or the degradation point of the selected metal material.

The fusion process triggered in the process of the present invention is, preferably, brazing. In the preferred embodiment, the metal material is elevated to the brazing temperature in as rapid a manner as possible. As described previously in conjunction with the solvent volatilization step, the metal is once again "shock heated" to produce a temperature rise from a point at or below the volatilization temperature of 900° F. to a point at or above the brazing temperature of between about 2,000° F. to about 2,050° F. This temperature elevation rate is sufficiently rapid to initiate brazing. The temperature rise is essentially "instantaneous". "Instantaneous temperature rise" as defined herein occurs in an interval no less than 400° per second. This contrasts sharply with conventional brazing procedures in which the temperature is brought up to the brazing point in a steady controlled manner. Without being bound to any theory, it is believed that the "shock heating" helps to initiate opening of the crystal grains present in the non-ferritic steel surface to permit a brazing metal such as copper to penetrate into the surface.

Once the temperature of the non-ferritic steel has been elevated to the fusion temperature, this temperature is maintained for an interval sufficient to achieve the formation of a metallurgical bond between the selected metal material and the non-ferritic steel surface. This "heat soak" phase can be defined as the time at which the material is held at the appropriate fusion temperature to permit formation of a metallurgical bond between the selected metal material and the steel surface. Without being bound to any theory, it is believed that this "soak time" continues the opening of the fine grain structure of the surface of the stainless steel initiated during the second shock heat phase permitting the bond to form. At temperatures above 2,000° F. during the heat soak phase, there is a notable precipitation of carbon; triggering and indicating a change from a martensitic to an austenitic surface. Without being bound to any theory, it is believed that this phenomenon may be necessary to achieve bond formation between a selected material such as copper and non-ferritic steels such as nickel chromium steel.

During the heat soak phase, the metal is maintained in a humidified gaseous atmosphere similar or equivalent to that employed in the "shock heat" phase. Thus, the humidified gaseous atmosphere consists essentially of a non-reactive carrier gas and a reactive gas suitable for and in sufficient concentrations to achieve fluxing. In the preferred embodiment, the humidified gaseous atmosphere contains between about 50% and about 75% by volume hydrogen in nitrogen with trace amounts of water. Humidification of the gaseous atmosphere may be achieved by bubbling a hydrogen stream through water prior to admixture with nitrogen.

After metal fusion has been achieved, the resulting fused material is maintained in the humidified gaseous atmosphere and permitted to cool to a first lowered temperature greater than the austenitic phase transformation temperature of the non-ferritic steel for an interval sufficient to help maximize the temperature at which subsequent metallurgical transformation of the non-ferritic steel from an austenitic phase to a pearlite phase occurs. In the preferred embodiment, the fused metal material is maintained at this first lowered temperature for about four to eight seconds. This temperature is, preferably, greater than about 1,250° F. After reaching this first metallurgical transformation associated with a temperature of about 1,250° F. and a time interval of 4 to 8 seconds, the fused metal can be rapidly cooled in the controlled atmosphere to a second lowered temperature below which the non-ferritic metal enters the pearlite phase. In the preferred embodiment, this second lowered temperature is about 950° F. Without being bound to any theory, it is believed that this rapid cooling to the second lowered temperature is analogous to a metallurgical freezing. The term "freezing" as used herein defines a process which promotes a coarse grained crystal lattice structure in the non-ferritic steel. It is believed that this coarse grain structure improves the malleability of the resulting material.

After reaching this second lowered temperature, the fused metal can be cooled at a controlled rate in a non-oxidative atmosphere to a third lowered temperature below which the selected metal is not reactive with oxygen. Where copper is employed as the selected metal material, this third lowered temperature is below about 500° F. and preferably between the temperatures of about 350° F. and 500° F. Below this temperature, the selected brazed material, such as the copper, is not reactive with oxygen. This prevents undesired discoloration of the copper surface. At this point, the material can be safely removed from the controlled environment with little or no fear of oxidation or discoloration.

In order to facilitate ease of handling of the continuous double-walled tubing or other metal material, the material can, finally, be quenched in a suitable aqueous medium.

In order to further illustrate the process with regard to producing non-corrosive, double-walled tubing, reference is made to FIG. 1 which schematically depicts a tube forming process and line incorporating the process of the present invention.

In FIG. 1 is a production line 10 having a pay-off reel 12 which contains strips of non-ferritic steel with the selected metal being overlaid and mechanically, chemically or electrochemically attached to the non-ferritic steel surface.

The continuous sheet of non-ferritic steel is, preferably, between 0.25 and 0.35 millimeters thick and has a width suitable for producing a double-walled tube of an appropriate diameter. The length of the continuous strip is determined by handling constraints and requirement needs. The continuous strip (not shown) is advanced to a suitable roll form milling machine 14 which sequentially produces unbrazed, unsealed double-walled tubing. The tubing is immediately advanced to a volatilization station 16 which includes means for removing volatile portions of lubricating material employed during the milling steps (not shown).

In the preferred embodiment, the removing means employed in the volatilization station is a heating means which comprises a source 18 for anhydrous nitrogen gas and a heater (not shown). The heater can be any suitable heating means such as a resistance heater, an induction heater or a muffle furnace. In the preferred embodiment, an induction heater is employed. The induction heater is configured to permit the elevation to the volatilization temperature at or above 900° F. at a rate and for a period sufficient to permit effective volatilization of solvents and carriers employed in lubricating material employed during the milling process. In the preferred embodiment, as set forth in FIG. 1, any particular section of the continuous double-walled tube is exposed in the volatilization station 16 for a period between about 30 seconds and about five minutes. The tubing is, then, conveyed through a conduit (not shown) to the brazing station 20 upon exiting the volatilization station 16. The conduit and volatilization station 16 are equipped with suitable means for venting the volatilized solvents and introduced nitrogen gas in a suitable manner (not shown).

The brazing station 20 consists of heating means for rapidly rising the surface temperature of the continuous tube to an elevated temperature sufficient to trigger fusion between the non-ferritic steel and the selected metal layers thereon. Also included are means for providing a humidified gaseous atmosphere within the brazing station. The heating means can be either a resistance or an induction heater or any other suitable heater capable of essentially instantaneously raising the surface temperature of the non-ferritic steel to a temperature at or above the brazing temperature for the selected metal layered thereon (not shown). The gas preferably employed is composed of a predominantly nitrogen atmosphere containing sufficient hydrogen to achieve and maintain fluxing. In the preferred embodiment, the gas is humidified by bubbling the hydrogen through a suitable bubbling tank (not shown). The gas is supplied in any conventional manner such as from gas bank 22 in FIG. 1.

Once the material has been shock heated in the brazing station 20, it is conveyed to a suitable heat soak station 24. The heat soak station 24 can be any type of heater capable of maintaining the double-walled tube at a temperature at or above a brazing temperature of about 2,050° F. In the preferred embodiment, the heat soak station 24 is an elongated muffle furnace. The heat soak station 24 is also supplied with the humidified gaseous mixture of hydrogen and nitrogen from the gas bank 22.

Upon exiting the heat soak station 24, the continuous metal tube has been fused into its leak-proof, double-walled state. At this point, it can be conveyed through a water-cooled jacket 26 to provide a controlled cool-down phase in which the elevated temperature is maintained at or above about 1,250° F. for a period sufficient to control grain size and structure to provide larger grain size for greater flexibility of the resulting tube. In general, each particular section of the continuous tube is exposed to the controlled cool-down phase for a period sufficient to maximize the temperature at which the non-ferritic metal transforms from austenitic through its transition phase into its pearlite phase. The initial controlled cool-down occurs immediately after the section of the continuous double-walled metal tube exits the heat soak station 24. This phase proceeds for a period of about three to six seconds. The continuous metal tubing is maintained in a controlled atmosphere and is, then, quickly cooled through its isothermal transformation state from its austenitic phase to its pearlite phase in a water-cooled jacket 26. This minimizes the time in which the material is in its transformation stage and maximizes the temperature at which the material exits that stage and enters into the pearlite phase. In the preferred embodiment, this occurs at approximately 950° F.

After this step is completed, the material is passed through an air cooling station 28 which can be comprised of a multiple fin-tubed heat exchanger. The tubing is maintained in a controlled atmosphere during the air cooling stage to prevent oxidation and discoloration of the fused copper material which would occur if it were exposed to oxygen. After the tubing reaches a temperature at or below 500° F., the material may be liquid quenched in the quench bath 30 to further reduce the latent heat to a point where the continuous metal tube can be easily handled. The material can then be exposed to air and be subjected to post-process stations such as testing stations 32, stretching stations 34, and eventually, a coiling station 36.

The process of the present invention permits the formation of unique brazed double-walled tubing from a copper plated strip. The tubing thus formed is comprised of a continuous latitudinal spiral of metal providing two thicknesses of the non-ferritic steel at any point through the circumference of the tube. The edges of the copper-plated non-ferritic steel strip are suitably shaped to permit the edges to sealingly conform to the contours of the associated external or internal surface of the tube. In this manner, the tubing can be brazed to provide a seamless seal, as well as continuous brazing around 360° of the double-walled metal tube. This tube is uniquely constructed in that the material of choice is a non-ferritic steel, such as nickel chromium steel which is brazed by the action of heating copper material plated thereon. The resulting tube is highly resistant to corrosion.

The unique double-walled tubing formed by the process of the present invention comprises concentric inner and outer walls consisting essentially of steel exhibiting a face-centered cubic grain structure. The walls are metallurgically bonded in a manner sufficient to form a continuous seal therebetween. Between the inner and outer walls, the tubing of the present invention has a characteristic metallurgical bonding region which has a central layer consisting essentially of a brazable metal or metal alloy. In the preferred embodiment, the brazeable metal or metal alloy is a material selected from the group consisting of copper, silver, copper alloy, silver alloy and mixtures thereof, with copper and alloys thereof being most preferred. The bonding region is also characterized by a region of penetration by the brazeable material into interstices in the grain structure of the adjacent steel of the respective walls immediately proximate to the wall surfaces. The region of penetration is defined by an essentially regular flat outer boundary layer defined by the cubic grains of steel into which essentially linear projections of the brazeable metal extend at essentially regular intervals. The projections of brazeable metal extend inward to a depth and at a concentration sufficient to provide an essentially permanent metallurgical bond. The maximum depth of the penetration is limited to a depth which is less than that which will initiate excessive instances of hot cracking at the interface. Preferably, the penetration depth is between about 1 μm and about 2 μm. The penetration layer preferably can also be characterized by the presence of nickel and nickel containing compounds dispersed therein.

The steel employed in the tubing of the present invention is preferably a non-ferritic austenitic steel containing 0.03% by wt carbon or less, between 5.5 and 7.5% manganese, up to 0.10% silicon, between 3.5% and 5.5% nickel, up to 0.25% nitrogen, between 16.00 and 18.00% chromium with the balance being iron. Suitable grades of stainless steel are those commonly referred to under the AISI designation 201L.

In the double-walled tubing of the present invention, the inner and outer walls are each characterized by an outwardly oriented face and an inwardly oriented face with an inner steel region interposed therebetween. The inwardly and outwardly oriented faces are defined particularly by concentrations of the characteristic face-centered cubic metal grains to form an essentially uniform outermost boundary surface. In the tubing of the present invention, the bonding metal penetrates into the intergranular area close to the boundary to form the characteristic projections found at the diffusion zone.

EXAMPLE I

Double-wall tubing composed of 201L stainless steel was prepared according to the process of the present invention using a nickel strike applied to the steel tube surface prior to copper brazing. The tubing was brazed in an atmosphere containing 75% hydrogen and 126 ppm water at a temperature of 2050° F. with a dwell time of 25 sec. after which the tubing was rapidly coded to a temperature below which it was non-reactive with oxygen. Samples of the resulting tube were, then, inspected by metallographic examination and scanning electron microscopy (SEM).

Two samples were removed from the tube, one sample a transverse cut and the other a longitudinal one. The samples were mounted in bakelite, ground, and polished using standard metallographic techniques. After polishing, the mounts were examined at magnifications up to 500×.

The samples were etched with an aqueous solution containing 5 ml nitric acid, 1 ml hydrogen fluoride and 44 ml water to reveal microstructure and to see if copper had penetrated into the grain boundaries. FIGS. 2a, 2b, 3a and 3b are photomicrographs of transverse and longitudinal sections. The microstructure exhibited was characterized by equlaxed grains with copper penetrating into the region between the grain boundaries.

Figure 4A:
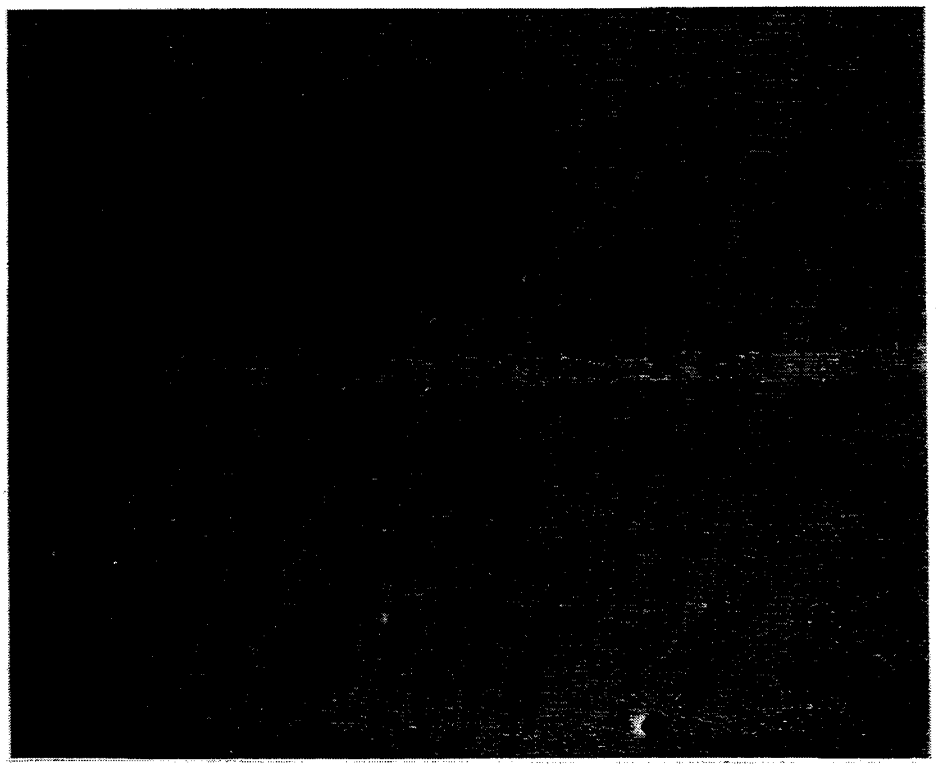
FIG. 4a is a reference SEM photograph of the transverse section of the tubing prepared according to the present invention at a magnification of 500×.
Figure 4B:
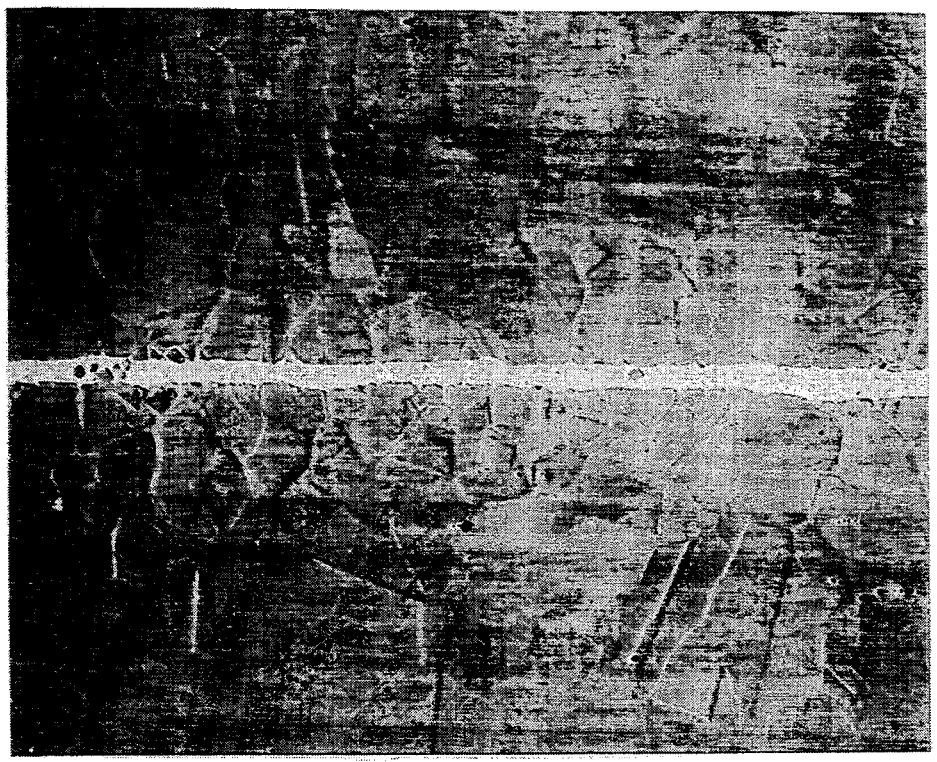
FIG. 4b is a reference SEM photograph of the longitudinal section of the tubing prepared according to the present invention at a magnification of 500×.
Figure 5A:
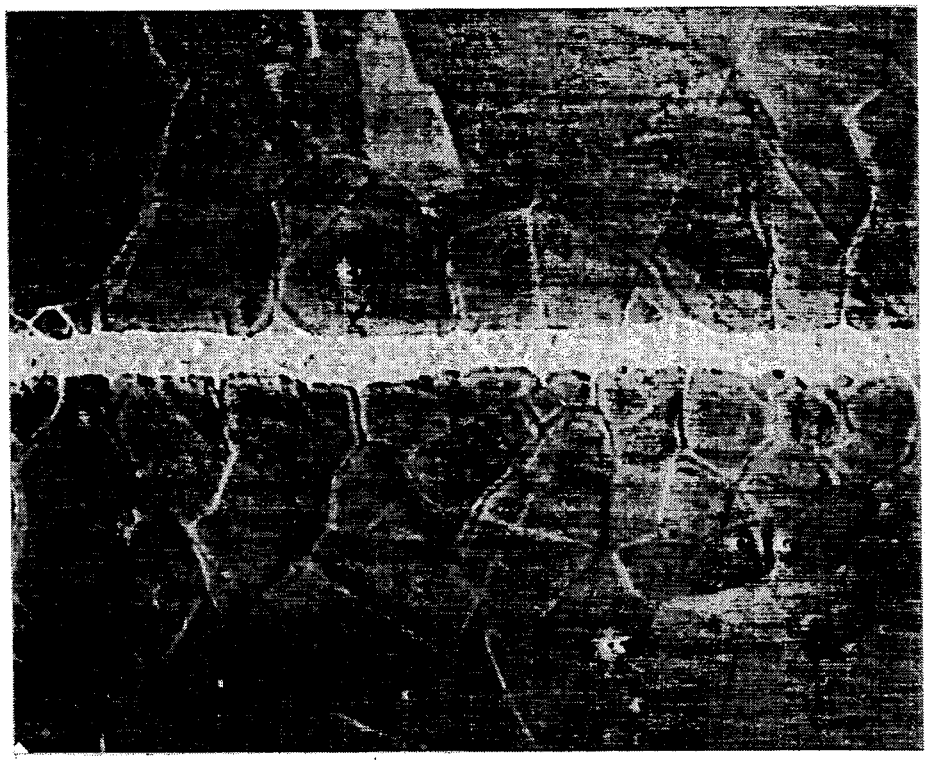
FIG. 5a is the longitudinal section of FIG. 4b at a magnification of 1000×.
Figure 5B:
Figure 5C:
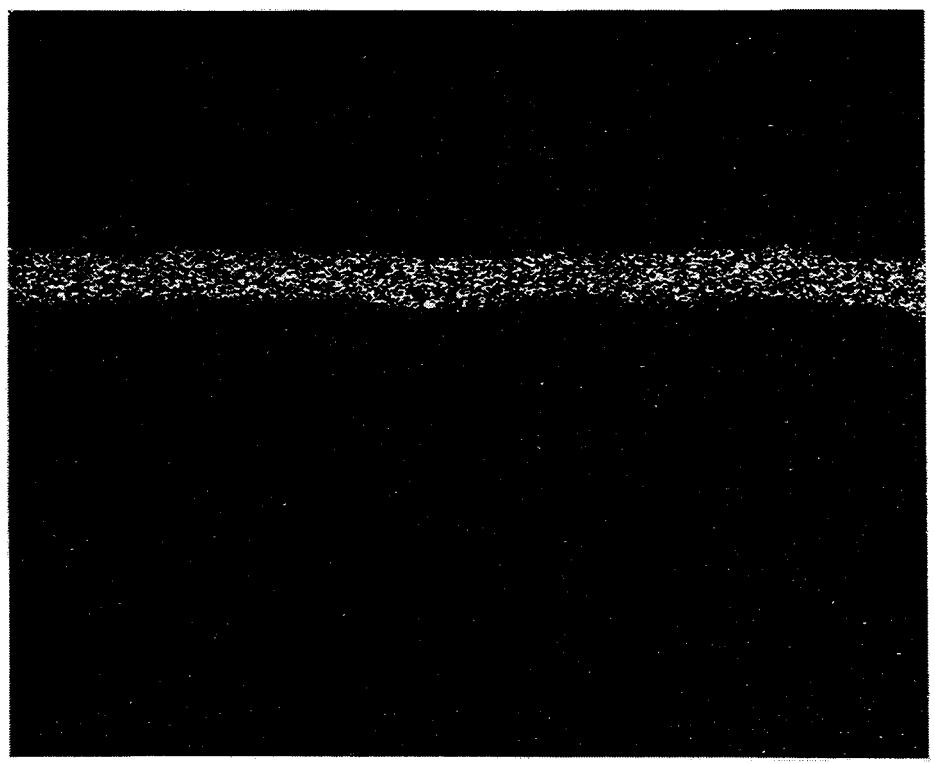
Figure 6A:
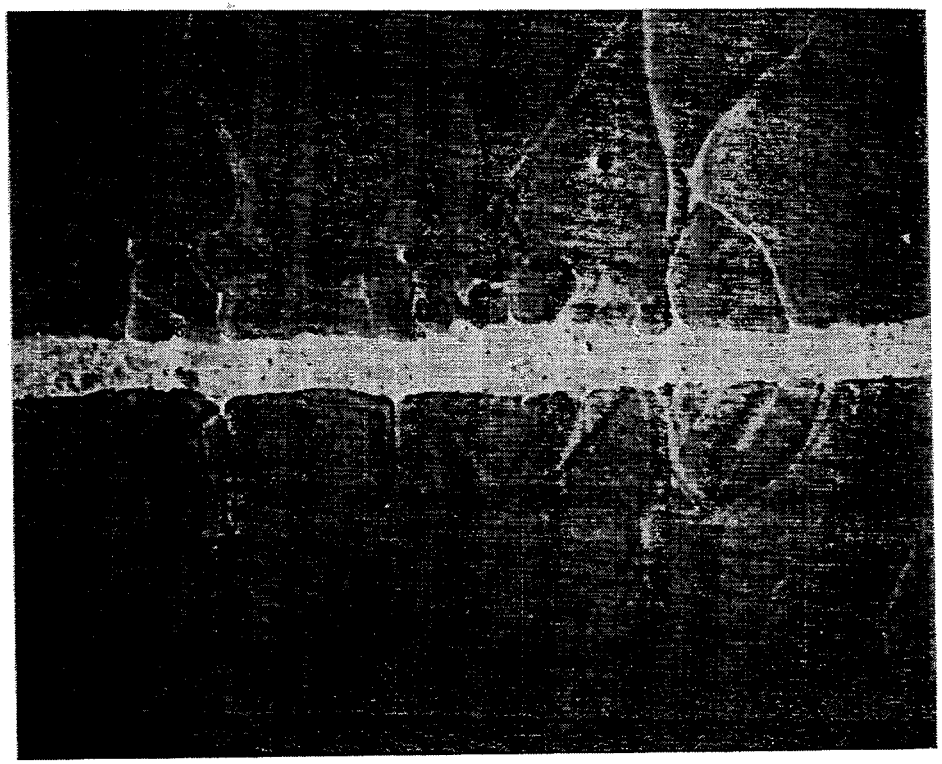
FIG. 6a is a reference SEM photograph of the transverse section of the tubing prepared according to the present invention magnified 1000×.
Figure 6B:
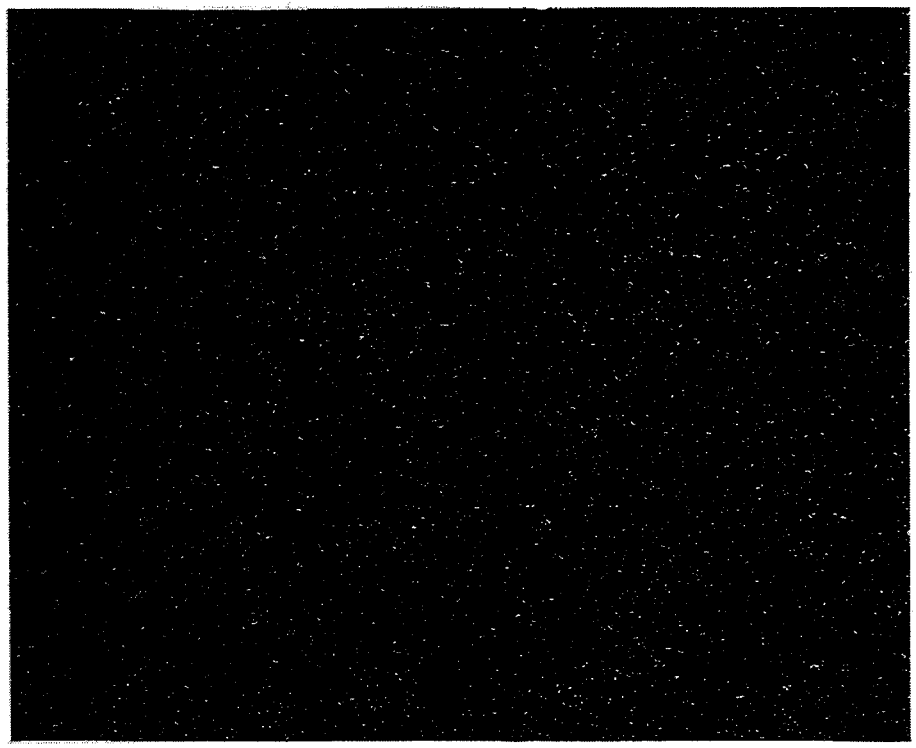
Figure 6C:

The metallographic mounts were made conductive, then placed in the SEM, one at a time, for dot mapping. Reference photographs were taken at the location of the dot mapping (see FIG. 4a and 4b). Dot mapping was performed for copper and nickel on the transverse and longitudinal sections of the tube. FIG. 5a-c and FIG. 6a-c present the results of the dot mapping for copper and nickel of the sections.

EXAMPLE II

Tests were conducted in order to form a comparison between tubing prepared according to the process of the present invention and low carbon steel tubing having a nickel strike applied prior to copper brazing. The low carbon steel employed was material commonly identified by the trade designation AISI 1008. In order to achieve brazing, a standard reducing atmosphere composed of hydrogen, carbon monoxide, carbon dioxide, methane and oxygen was employed. Brazing was not possible with the hydrogen/nitrogen atmosphere employed in Example I. Samples of the resulting tube were, then, inspected by metallographic examination and scanning electron microscopy (SEM).

Two samples were removed from the tube, one sample a transverse cut and the other a longitudinal one. The samples were mounted in bakelite, ground, and polished using standard metallographic techniques.

After polishing, the mounts were examined at magnifications up to 500×.

Figure 7A:
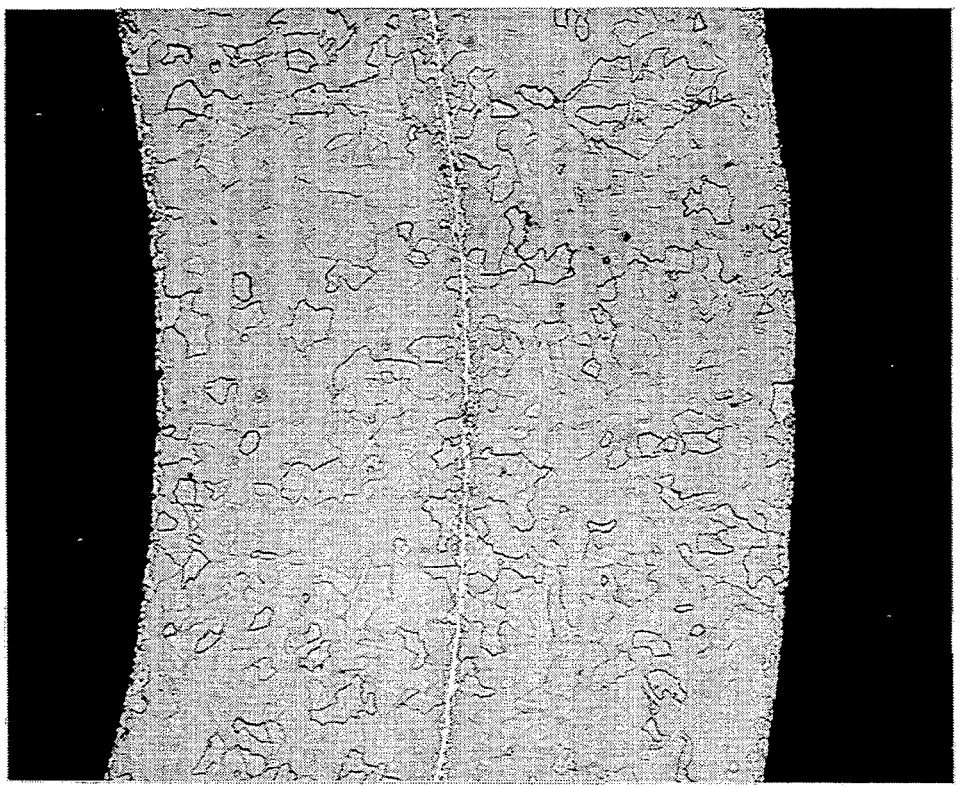
FIG. 7a is a photomicrograph of a transverse section of low carbon steel tubing prepared according to conventional processes at a magnification of 100×.
Figure 7B:
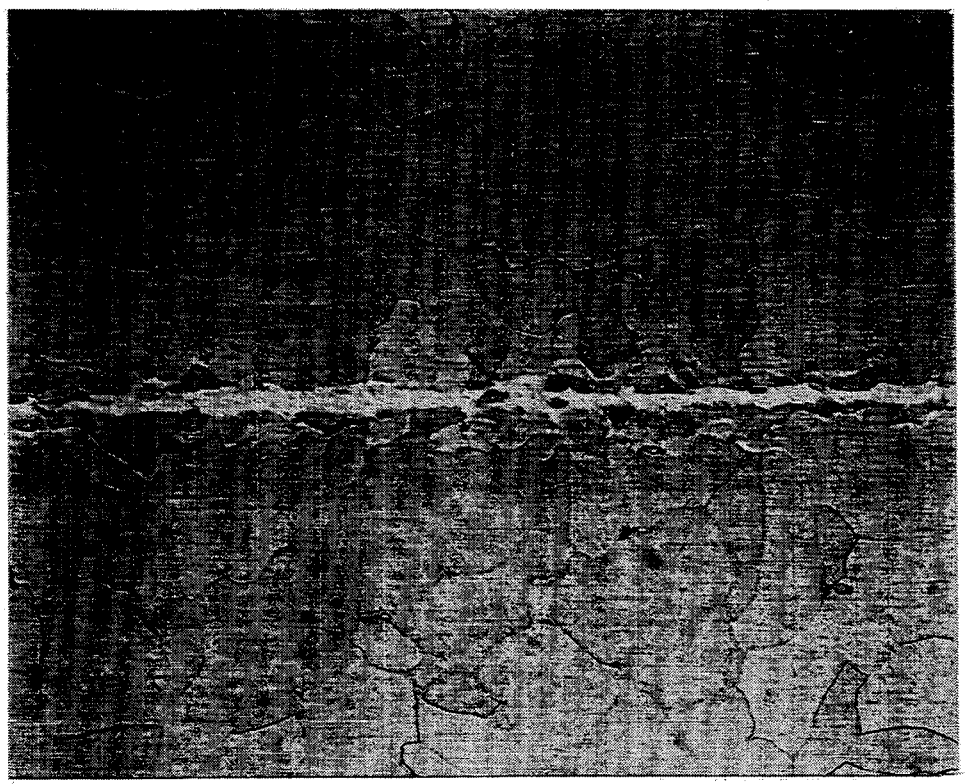
FIG. 7b is a photomicrograph of the transverse section of tubing in FIG. 7a at a magnification of 500×.
Figure 8A:
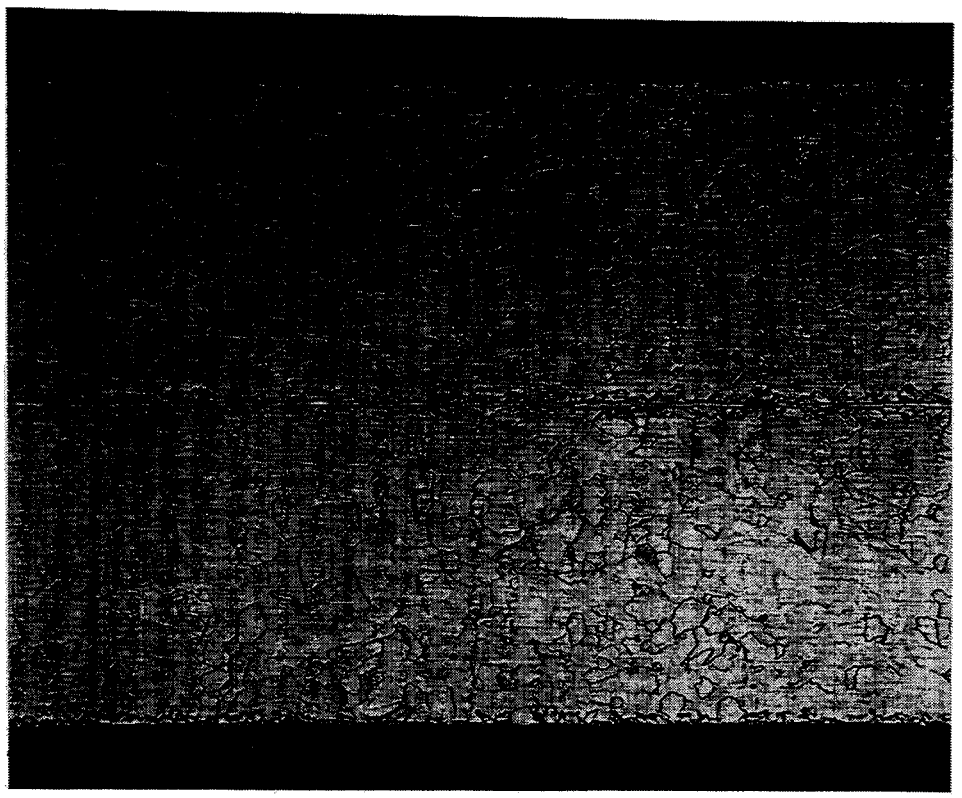
FIG. 8a is a photomicrograph of the longitudinal section of low carbon steel tubing at a magnification of 100×.
Figure 8B:
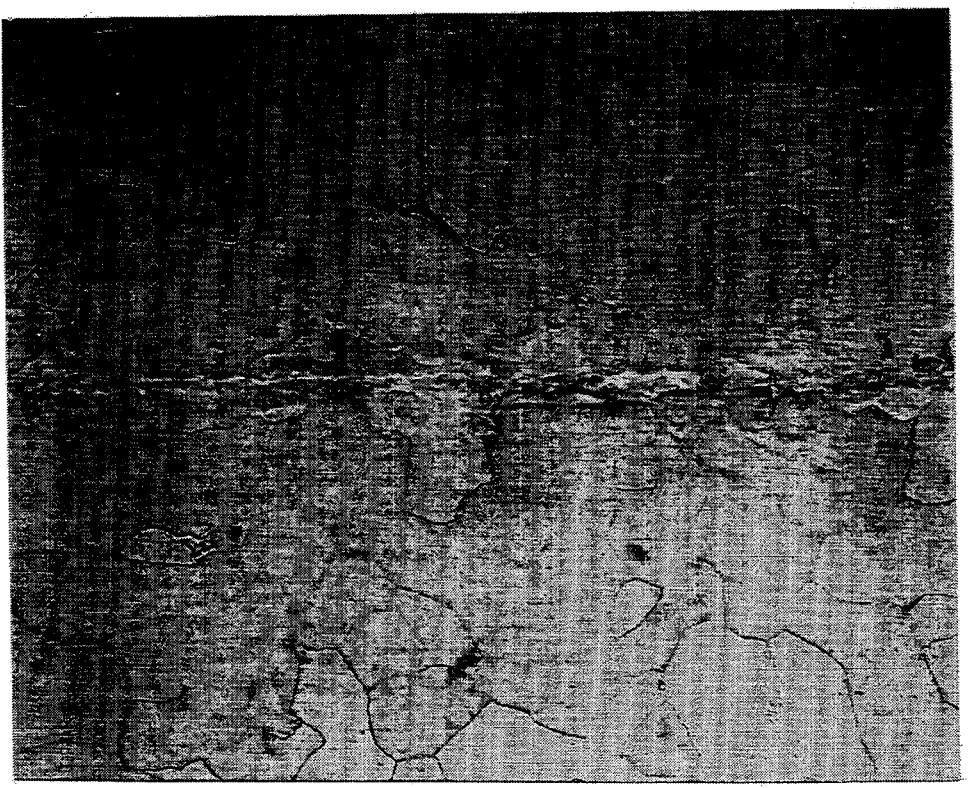
FIG. 8b is a photomicrograph of the longitudinal section of FIG. 8a at a magnification of 500×.

The low carbon steel copper brazed tube samples were etched with 2% nital to reveal the microstructures and to see if any copper had penetrated into the grain boundaries. FIGS. 7a and 7b are photomicrographs of the transverse and longitudinal sections. The microstructure exhibited ferrite with a medium grain size with some irregular copper penetration into the grain structure.

Figure 9A:
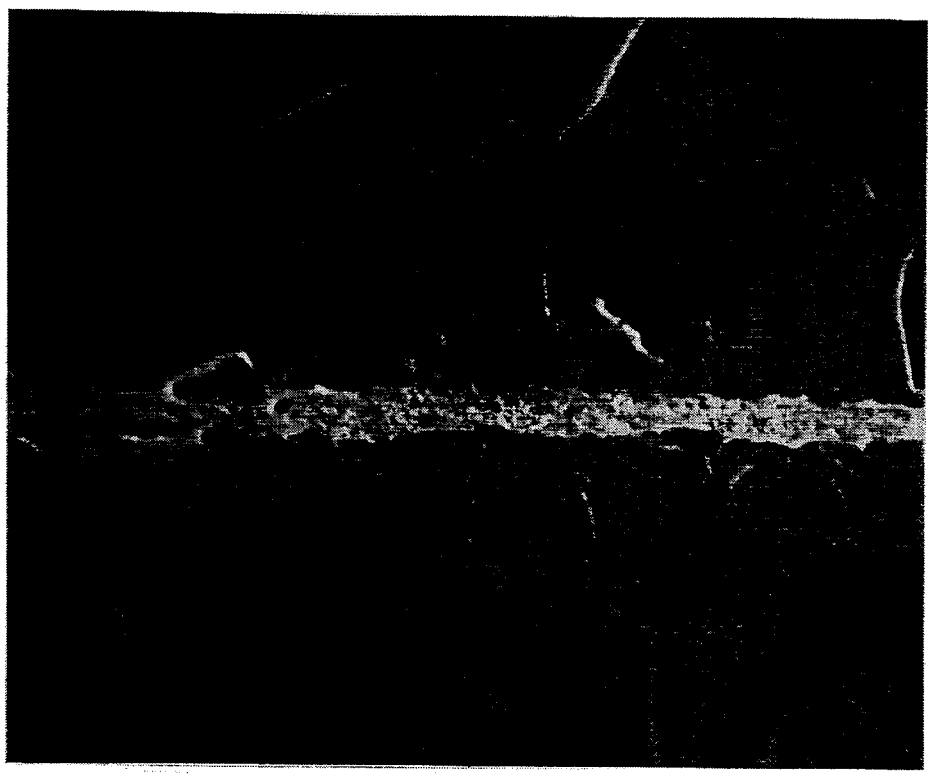
FIG. 9a is a photomicrograph of the longitudinal section of FIG. 8a at a magnification of 1000×.
Figure 9B:
Figure 9C:
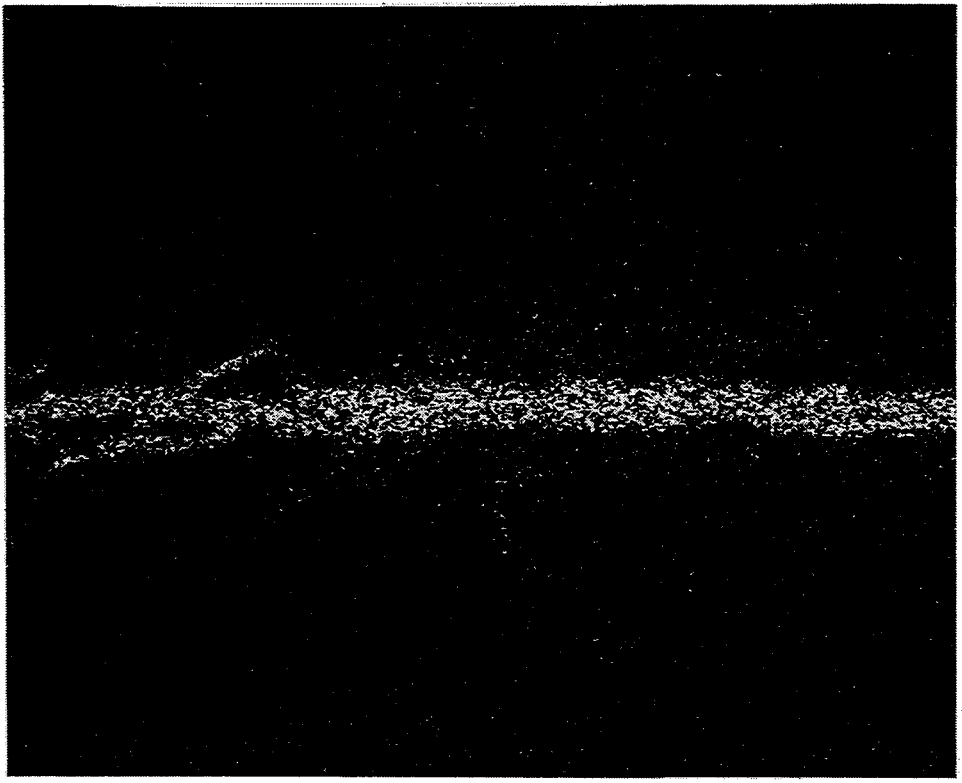
Figure 10A:
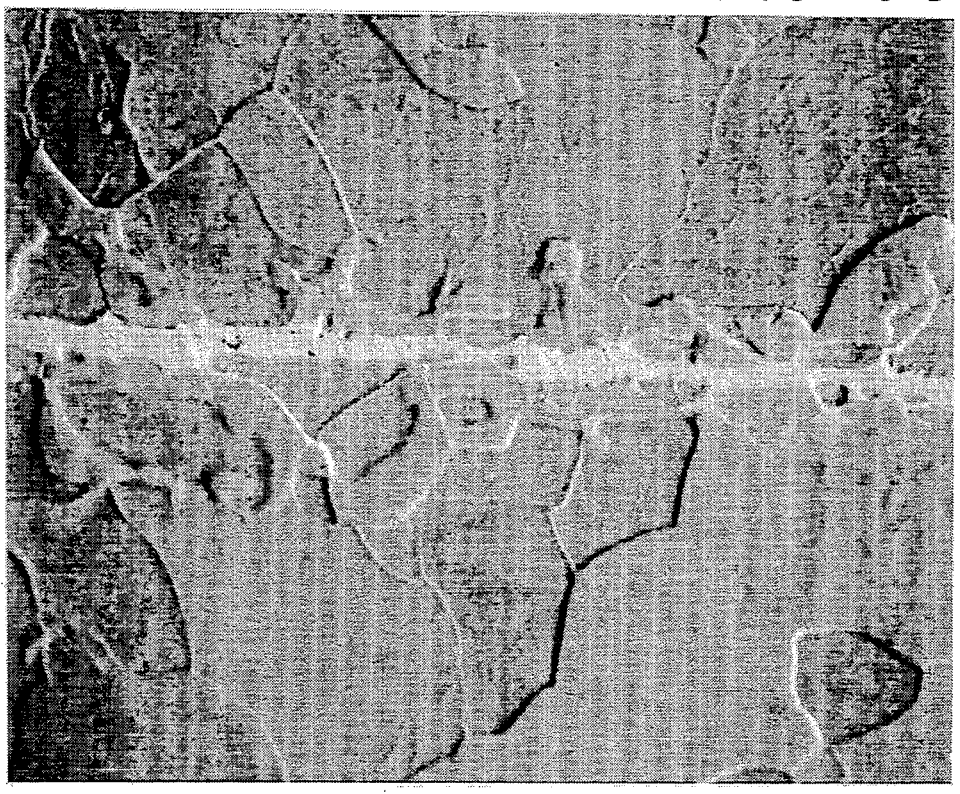
FIG. 10a is the photomicrograph of the transverse section of tubing of FIG. 7a at a magnification of 1000×.
Figure 10B:
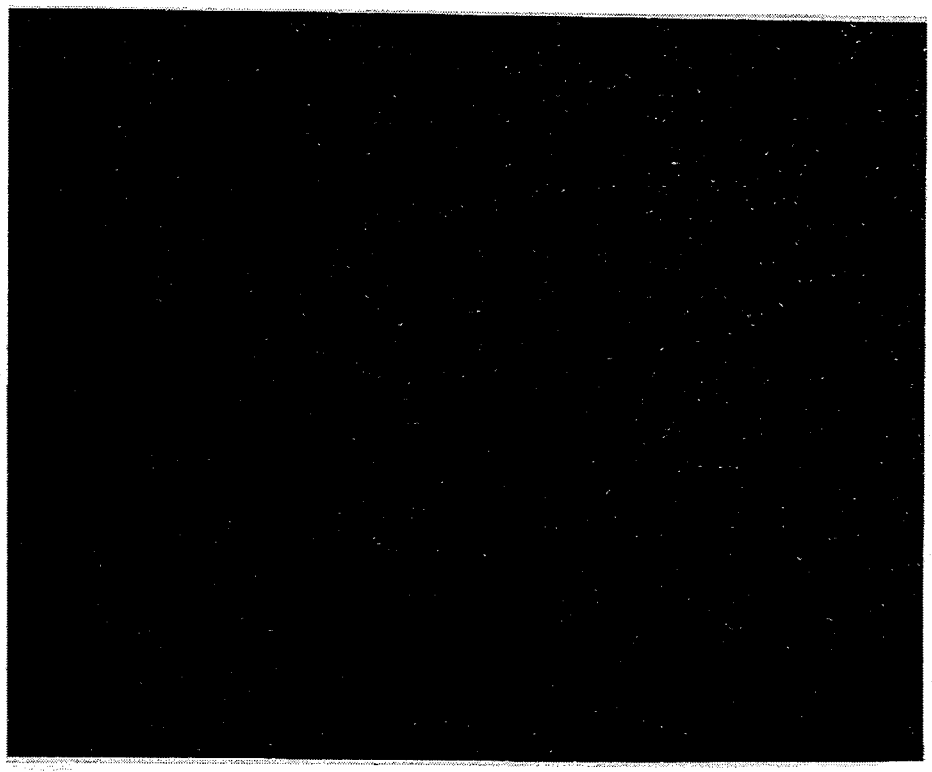
Figure 10C:
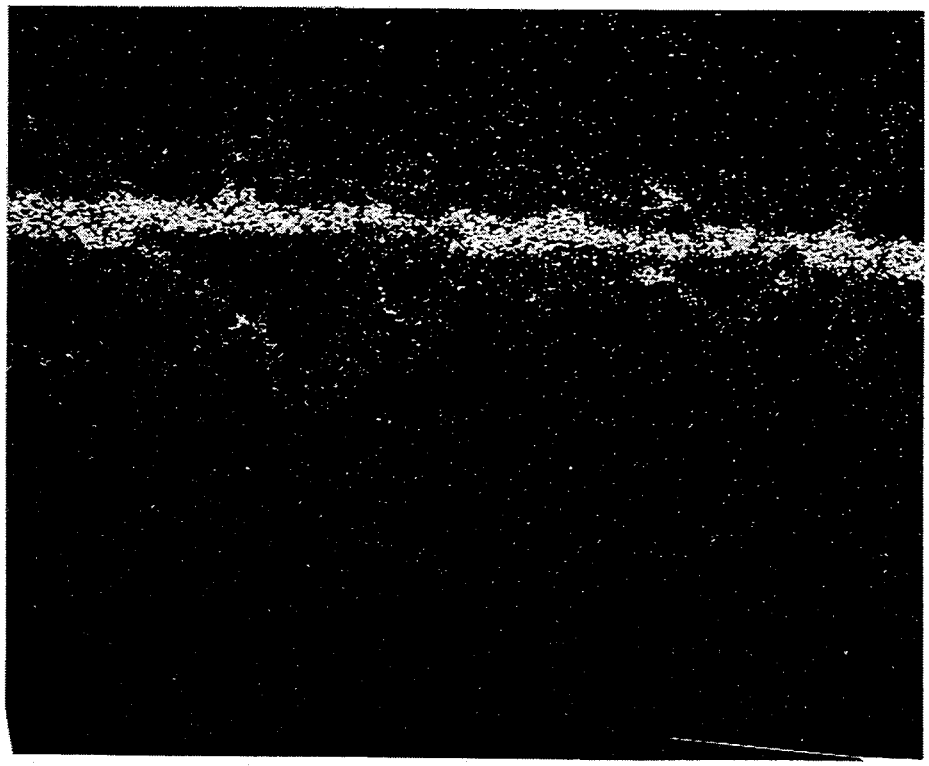
Figure 11A:
FIG. 11a is a reference SEM photograph of the transverse section of low carbon steel tubing at a magnification of 500×.
Figure 11B:
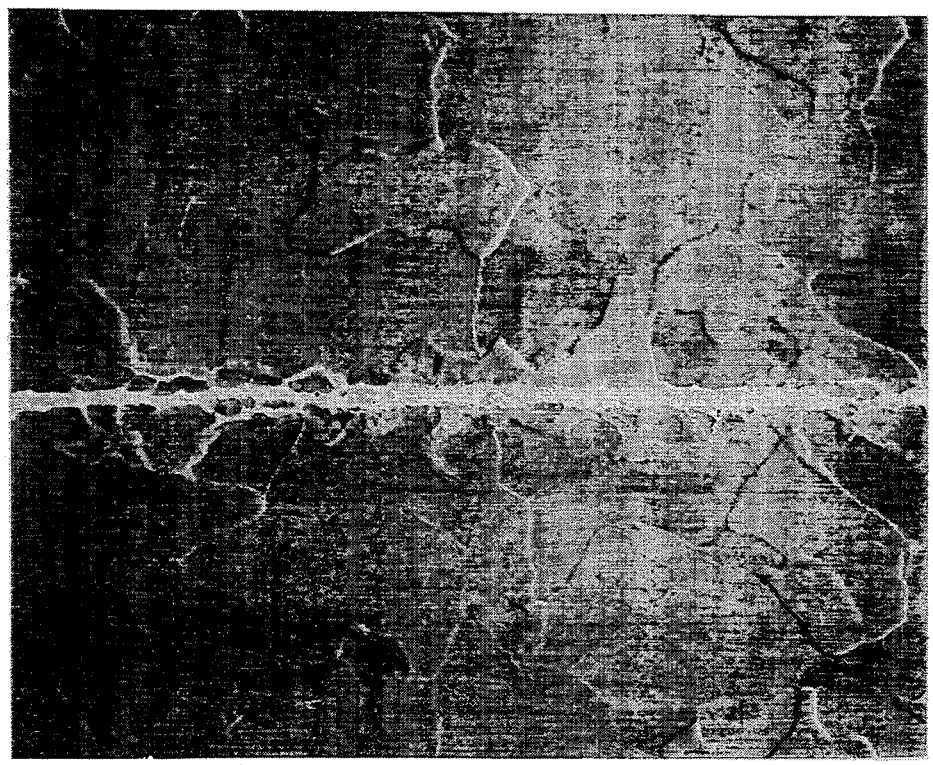
FIG. 11b is a reference SEM photograph of the longitudinal section of low carbon steel tubing at a magnification of 500×.

The metallographic mounts were made conductive, then placed in the SEM, one at a time, for dot mapping. Reference photographs were taken at the location of the dot mapping (see FIG. 9a and 9b). Dot mapping was performed for copper on the longitudinal and transverse sections of the tube. FIG. 10a–c and FIG. 11a–c present the results of dot mapping for copper and nickel sections.

As can be seen from a comparison of the photomicrographs of tubing prepared by the methods outlined in the two examples, the method of the present invention provides a tubing material which has a microcrystaline structure which differs markedly from tubing materials previously manufactured.

EXAMPLE III

Tubing material prepared according to the method of Example I was tested employing the methods outlined in ASTM A254 to determine hydrostatic capacity as outlined in ASTM A254 Paragraph 6.5/6.5.1, tensile strength and yield strength (Paragraph 6, Table 2), performance upon flaring (Paragraph 6.3) as well as harness (ASTM E18).

The tubing tested measured approximately 30 feet in length and had an outer diameter of 3/16 inches and a wall thickness of 0.022 inches. The standard for hydrostatic pressure as defined for tubing is the ability to withstand a pressure of at least 3,459 psi. The tubing tested showed no failure at 6,000 psi. Tubing have a minimum tensile strength of 42,000 psi and a yield strength of 71,400 psi. The tubing tested exhibited a tensile strength of 101,600 psi and a yield strength of 71,400 psi. Minimum elongation in 2 inches is set at 25% The tested sample had a elongation of 51.0% in 2 inches.

The tested sample exhibited no detectable cracking or flaws in the flare test and had a Rockwell "B" hardness between 96.5 and 97.5.

What is claimed is:

1. A double-walled metal tube comprising:
    an outer wall consisting essentially of steel having a face-centered cubic grain structure, said outer wall having an inwardly oriented surface and an outwardly oriented surface;
    an inner wall concentrically disposed within said outer wall, said inner wall consisting essentially of a steel having a face-centered cubic grain structure, said inner wall having an inwardly oriented surface and an outwardly oriented surface, said outwardly oriented surface being directed toward said inwardly oriented surface of said outer wall;
    an intermediate bonding metal region interposed between and metallurgically bonded to said inner wall and said outer wall, said intermediate bonding metal region consisting essentially of a metal capable of metallurgically bonding with said inner wall and said outer wall.

2. The double-walled tube of claim 1 wherein said inwardly oriented surface of said outer wall and said outwardly oriented surface of said inner wall each comprise:
    an outer surface boundary composed of essentially flattened cubic crystalline metallic granules forming an essentially regular flat outer surface;
    a diffusion zone located interiorly adjacent to said outer surface boundary, said diffusion zone characterized by said metallic granules and a plurality of essentially linear crevices defined by and between said metallic granules, said crevices containing metal capable of metallurgically bonding with said inner wall and said outer wall; and
    an interior zone adjacent to said diffusion zone, said interior zone consisting essentially of said steel.

3. The double-walled tubing of claim 2 wherein said diffusion zone has a depth sufficient to permit metallurgical bonding between said intermediate bonding metal region and said outwardly oriented wall surface of said inner wall and said inwardly oriented wall surface of said outer wall.

4. The double-walled tubing of claim 3 wherein said diffusion zone has a depth between about 1 μm and about 2 μm.

5. The double-walled tubing of claim 1 wherein said bonding metal region comprises:
    a central metal layer consisting essentially of said metal capable of metallurgical bonding with said inner wall and said outer wall; and
    two opposed diffusion zones located on either side of said central metal layer, said diffusion zones comprising a plurality of outwardly extending projections of said metal capable of metallurgically bonding with said inner wall and said outer wall, said outwardly extending projections extending between individual grains present on said outwardly oriented wall surface of said inner wall and said inwardly oriented wall surface of said outer wall.

6. The double-walled tubing of claim 5 wherein said metal capable of metallurgically bonding with said inner wall and said outer wall is a brazing material capable of forming said metallurgical bond at a temperature between about 1900° F. and about 2100° F.

7. The double-walled tubing of claim 5 wherein said metal capable of metallurgically bonding with said inner wall and said outer wall is selected from the group consisting of copper, silver, copper alloys, silver alloys and mixtures thereof.

8. The double-walled tubing of claim 6 wherein said diffusion zones have a depth sufficient to provide an essentially permanent uniform fusion between said inner wall and said outer wall.

9. The double-walled tubing of claim 8 wherein said diffusion zone has a depth between about 1 μm and 2 μm.

10. The double-walled tubing of claim 5 wherein said inner wall and said outer wall consist essentially of alloyed austenitic steel.

11. A double-walled metal tube comprising:
    an outer wall;
    an inner wall concentrically disposed within said outer wall, said inner and outer walls formed from a flat axial band by means of axial rolling, said flat axial band consisting essentially of an alloyed austenitic steel having a face-centered cubic surface grain structure and interstitial regions defused therebetween; wherein said outer wall and said inner wall are metallurgically bonded by means of a brazing material selected from the group consisting of copper, silver, copper alloy, silver alloy, and mixtures thereof to form a bonding region interposed between said inner and outer walls.

12. The double-walled metal tube of claim 11 wherein said bonding region comprises:

a central region consisting essentially of said brazing material;

a dispersion layer comprising said face centered cubic surface grain structure of said alloyed austenitic steel having sufficient nickel dispersed therein to a depth and at a concentration sufficient to permit penetration of portions of said brazing material into interstitial regions between individual grains in said face-centered cubic surface grain structure.

* * * * *